(12) United States Patent
Lee et al.

(10) Patent No.: US 10,163,452 B2
(45) Date of Patent: Dec. 25, 2018

(54) ELECTRONIC DEVICE FOR SPEECH RECOGNITION

(71) Applicant: LG ELECTRONICS INC., Seoul (KR)

(72) Inventors: Byounggi Lee, Seoul (KR); Hyejeong Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 79 days.

(21) Appl. No.: 15/350,804

(22) Filed: Nov. 14, 2016

(65) Prior Publication Data
US 2017/0330583 A1    Nov. 16, 2017

(30) Foreign Application Priority Data

May 13, 2016  (KR) .......................... 10-2016-0058610

(51) Int. Cl.
| | |
|---|---|
| *H04B 15/00* | (2006.01) |
| *G10L 21/0232* | (2013.01) |
| *G10L 15/22* | (2006.01) |
| *H04R 1/32* | (2006.01) |
| *H04R 3/00* | (2006.01) |

(Continued)

(52) U.S. Cl.
CPC .......... *G10L 21/0232* (2013.01); *G10L 15/22* (2013.01); *G10L 21/0208* (2013.01); *H04R 1/326* (2013.01); *H04R 3/005* (2013.01); *G10L 2015/223* (2013.01); *G10L 2021/02165* (2013.01); *G10L 2021/02166* (2013.01); *H04R 1/028* (2013.01); *H04R 2410/05* (2013.01); *H04R 2499/11* (2013.01)

(58) Field of Classification Search
CPC ... G10L 15/20; G10L 15/22; G10L 2105/223; G10L 2021/02165; G10L 2021/02166; H04R 1/08; H04R 1/083; H04R 1/326; H04R 3/005
USPC ..... 381/94.1, 94.2, 110, 355, 356, 357, 360, 381/361, 365
See application file for complete search history.

(56) References Cited

U.S. PATENT DOCUMENTS

| | | | | |
|---|---|---|---|---|
| 5,524,056 A | * | 6/1996 | Killion | ................. H04R 25/407 |
| | | | | 381/309 |
| 2004/0167777 A1 | * | 8/2004 | Hetherington | ...... G10L 21/0208 |
| | | | | 704/226 |

(Continued)

FOREIGN PATENT DOCUMENTS

| | | |
|---|---|---|
| JP | 62-37279 A | 2/1987 |
| JP | 6-67691 A | 3/1994 |

(Continued)

*Primary Examiner* — Katherine A Faley
(74) *Attorney, Agent, or Firm* — Birch, Stewart, Kolasch & Birch, LLP

(57) ABSTRACT

An electronic device including a voice obtaining microphone configured to receive a voice signal including a noise at a first level; a noise obtaining microphone configured to receive a voice signal including a noise at a second level higher than the first level; and a controller configured to estimate the noise at the second level from the voice signal received by the noise obtaining microphone, remove the noise at the first level from the voice signal received by the voice obtaining microphone based on the estimated noise, and perform an operation corresponding to the voice signal having the noise at the first level eliminated therefrom.

18 Claims, 15 Drawing Sheets

(51) Int. Cl.
*G10L 21/0208* (2013.01)
*G10L 21/0216* (2013.01)
*H04R 1/02* (2006.01)

(56) References Cited

U.S. PATENT DOCUMENTS

| | | | | |
|---|---|---|---|---|
| 2007/0036344 A1* | 2/2007 | Lin | ............... | H04M 9/082 |
| | | | | 379/406.08 |
| 2008/0019551 A1* | 1/2008 | Watanabe | ............... | H04R 1/406 |
| | | | | 381/360 |
| 2010/0150367 A1* | 6/2010 | Mizuno | ............... | G10K 11/1782 |
| | | | | 381/71.6 |
| 2010/0329479 A1* | 12/2010 | Nakadai | ............... | H04R 3/005 |
| | | | | 381/92 |
| 2014/0156075 A1* | 6/2014 | Yang | ............... | A47L 11/4011 |
| | | | | 700/257 |
| 2015/0379992 A1* | 12/2015 | Lee | ............... | G10L 15/22 |
| | | | | 704/275 |

FOREIGN PATENT DOCUMENTS

| | | |
|---|---|---|
| KR | 10-2008-0038038 A | 5/2008 |
| KR | 10-2014-0135349 A | 11/2014 |
| WO | WO 2012/096072 A1 | 7/2012 |

\* cited by examiner

ELECTRONIC DEVICE FOR SPEECH RECOGNITION

CROSS REFERENCE TO THE RELATED APPLICATIONS

This application claims priority under 35 U.S.C. § 119 to Korean Application No. 10-2016-0058610, filed on May 13, 2016 which is hereby incorporated in its entirety by reference as if fully set forth herein.

BACKGROUND OF THE INVENTION

Field of the Invention

The present invention relates to an electronic device, and more particularly, to an electronic device and controlling method thereof. Although the present invention is suitable for a wide scope of applications, it is particularly suitable for performing a function or operation in response to a voice command input through a microphone.

Discussion of the Related Art

A device configured to behave by making self-decision according to a predetermined rule is called a robot. The robot is a device configured to simply performing a prescribed operation for itself or a device configured to operate based on recognized information by self-recognizing a situation or environment.

Thus, a robot can behave by making a behavior plan of high level enough to exclude human intervention owing to the development of artificial intelligence and is currently used for various fields. As a voice recognition function has been developed, a robot recognizes a user's voice, responds to the recognized voice, and performs a function or operation according to a voice command.

When such a robot performs a specific function or operation such as a cleaning, a driving or the like, a noise can be generated. If a noise level is too high, since a robot fails to recognize a user's voice command, the robot may fail to perform a function or operation according to the voice command or may perform an inappropriate function or operation.

Thus, the demand for the development of an electronic device capable of raising a recognition rate of a voice command by effectively eliminating notes generated from an outside or inside of a robot is increasingly rising.

SUMMARY OF THE INVENTION

Accordingly, embodiments of the present invention are directed to an electronic device and controlling method thereof that substantially obviate one or more problems due to limitations and disadvantages of the related art.

One object of the present invention is to provide an electronic device and controlling method thereof, by which a noise of a voice signal received from a voice obtaining microphone can be effectively eliminated by increasing a signal to noise ratio by disposing a noise obtaining microphone near a noise source.

Another object of the present invention is to provide an electronic device and controlling method thereof, by which a voice recognition rate can be raised by eliminating a noise of a voice signal having a smallest noise level in case of a presence of a multitude of voice obtaining microphones.

Another object of the present invention is to provide an electronic device and controlling method thereof, by which a voice recognition rate can be raised by estimating a nose of a voice signal at a highest noise level and then eliminating a noise of a voice signal received from a voice obtaining microphone in case of a presence of a multitude of voice obtaining microphones.

Another object of the present invention is to provide an electronic device and controlling method thereof, by which a noise of a voice signal can be eliminated by increasing a signal-to-noise ratio by rotating to move a noise obtaining microphone in a direction of a noise source having a greatest noise generated therefrom using a rotation frame having a noise obtaining microphone and the voice obtaining microphone disposed therein.

Further object of the present invention is to provide an electronic device and controlling method thereof, by which a noise of a voice signal can be eliminated by increasing a signal-to-noise ratio by rotating to move a noise obtaining microphone in a direction of a noise source having a noise generated therefrom due to vibration by disposing a vibration sensor.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, an electronic device according to one embodiment of the present invention may include a voice obtaining microphone configured to receive a voice signal including a noise at a first level, a noise obtaining microphone configured to receive a voice signal including a noise at a second level higher than the first level, and a controller configured to estimate the noise at the second level from the voice signal received by the noise obtaining microphone, eliminate the noise at the first level from the voice signal received by the voice obtaining microphone based on the estimated noise, and perform an operation corresponding to the voice signal having the noise at the first level eliminated therefrom.

In another aspect of the present invention, as embodied and broadly described herein, a method of controlling an electronic device including according to another embodiment of the present invention may include receiving a voice signal including a noise at a first level from a voice obtaining microphone, receiving a voice signal including a noise at a second level higher than the first level from a noise obtaining microphone, estimating the noise at the second level from the voice signal received by the noise obtaining microphone, eliminating the noise at the first level from the voice signal received by the voice obtaining microphone based on the estimated noise, and performing an operation corresponding to the voice signal having the noise at the first level eliminated therefrom.

BRIEF DESCRIPTION OF THE DRAWINGS

Arrangements and embodiments are described in detail with reference to the following drawings in which like reference numerals refer to like elements and wherein.

DETAILED DESCRIPTION OF THE EMBODIMENTS

Figure 1:
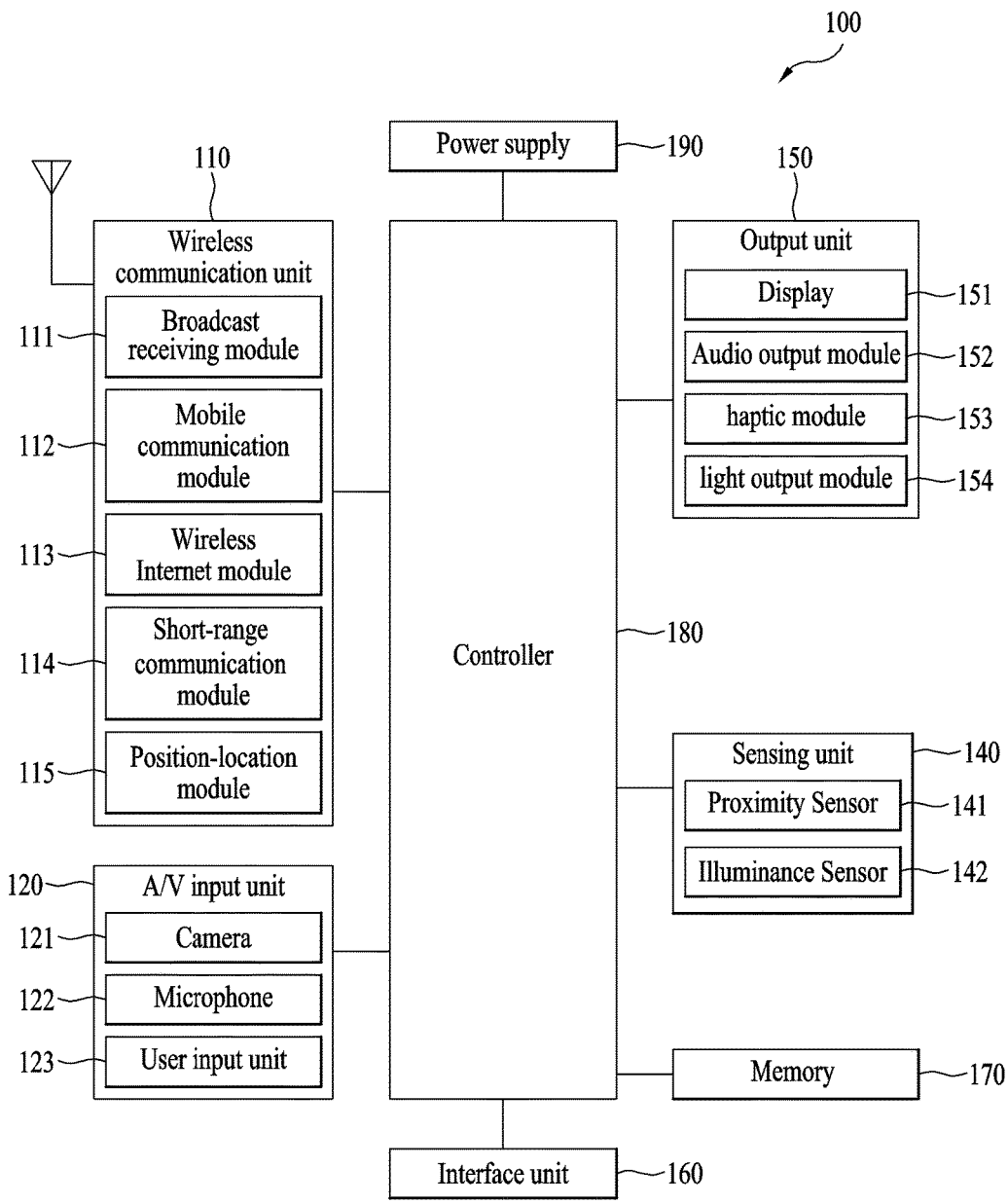
FIG. 1 is a block diagram describing an electronic device in association with the present invention.

Reference will now be made in detail to the preferred embodiments of the present invention, examples of which are illustrated in the accompanying drawings. Wherever possible, the same reference numbers will be used throughout the drawings to refer to the same or like parts, and repeated description will be omitted for simplicity. The suffixes "module" and "unit" that are mentioned in the elements used to describe the present invention are merely used for the purpose of simplifying the description of the present invention. Therefore, the suffixes "module" and "unit" may also be alternately used for the reference of a specific element of the present invention. Each of the suffixes will not be signified or used to differentiate one from the other.

Additionally, the accompanying drawings are merely provided to facilitate the understanding the embodiments disclosed in this specification. In addition, therefore, the technical scope and spirit disclosed in this specification will not be limited only to the accompanying drawings. Therefore, the accompanying drawings include all variations, equivalents and replacements that are included in the technical scope and spirit of the present invention.

Terms including ordinal numbers, such as "first", "second", and so on, may be used illustrating diverse elements. However, such elements will not be limited only to such terms. Herein, the corresponding terms will only be used to differentiate one element from another element. When an element is said (or described) to be "connected to" or "in connection with" another element, the corresponding element may be directly connected to or may be in direct connection with the other element. However, it should be understood that yet another element may exist in-between. Conversely, when an element is said (or described) to be "connected to" or "in connection with" another element, although the corresponding element may be directly connected to or may be in direct connection with the other element, it should also be understood that no other element exists between the two elements.

In this application, the terms "include(s)" or "have (or has)" are merely used to indicate the presence of a characteristic, number, step, operation, element, assembly part, or a combination of at least two or more of the above, which are mentioned in the description of the present invention. Therefore, the presence or possibility of additionally including one or more of other characteristics, numbers, steps, operations, elements, assembly parts, or combinations of the above will not be excluded in advance.

An electronic device disclosed in the present specification may include a terminal such as a mobile phone, a smartphone, a laptop computer, a digital broadcast terminal, a PDA (personal digital assistants), PMP (portable multimedia player), a navigation, a slate PC, a tablet PC, a ultrabook, a wearable device (e.g., a smartwatch, a smart glass, a head mounted display) (HMD), etc.). An electronic device disclosed in the present specification may include a machine capable of autonomously processing or operating a prescribed job like a robot. The robot included in the electronic device described in the present specification may be a fixed type, a mount type, or a movable type. Also, the movable-type robot may be configured to move autonomously.

FIG. 1 illustrates a structural block view of an electronic device according to an embodiment of the present invention. With reference to FIG. 1, the electronic device 100 includes a wireless communication unit 110, an A/V (audio/video) input unit 120, a sensing unit 140, an output unit 150, a memory 170, an interface unit 160, a controller 180, and a power supply unit 190. FIG. 1 shows the electronic device 100 having various components, but implementing all of the illustrated components is not a requirement. More or fewer components may be implemented according to various embodiments.

The wireless communication unit 110 typically includes one or more components which permit wireless communication between the electronic device 100 and a wireless communication system or network within which the electronic device 100 is located. For instance, the wireless communication unit 110 can include a broadcast receiving module 111, a mobile communication module 112, a wireless Internet module 113, a short-range communication or local area network module 114, and a position-location or position information module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the electronic device 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H). The broadcast receiving module 111 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 170. The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the electronic device 100. This module may be internally or externally coupled to the electronic device 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network. The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the electronic device 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the electronic device 100. As shown, the A/V input unit 120 includes a camera 121, a microphone 122 and a user input unit 123. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 170 or can be transmitted to an external recipient via the wireless communication unit 110. Optionally, at least two cameras 121 can be provided in the electronic device 100 according to the environment of usage. The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 123 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the electronic device 100 using status measurements of various aspects of the electronic device. For instance, the sensing unit 140 may detect an open/closed status of the electronic device 100, the relative positioning of components (e.g., a display and keypad) of the electronic device 100, a change of position (or location) of the electronic device 100 or a component of the electronic device 100, a presence or absence of user contact with the electronic device 100, and an orientation or acceleration/deceleration of the electronic device 100. As an example, an electronic device 100 configured as a slide-type electronic device is considered. In this configuration, the sensing unit 140 may sense whether a sliding portion of the electronic device is open or closed. According to other examples, the sensing unit 140 senses the presence or absence of power provided by the power supply unit 190, and the presence or absence of a coupling or other connection between the interface unit 160 and an external device. According to one embodiment, the sensing unit 140 can include a proximity sensor 141.

The output unit 150 generates output relevant to the senses of sight, hearing, and touch. Furthermore, the output unit 150 includes the display 151, an audio or sound output module 152, a haptic module 153, and a light output module 154. The display 151 is typically implemented to visually display (output) information associated with the electronic device 100. For instance, if the electronic device is operating in a phone call mode, the display will generally provide a user interface (UI) or graphical user interface (GUI) which includes information associated with placing, conducting, and terminating a phone call. As another example, if the electronic device 100 is in a video call mode or a photographing mode, the display 151 may additionally or alternatively display images which are associated with these modes, the UI or the GUI.

The display 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The electronic device 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user can see an object located at the rear of a terminal body on a portion of the display 151 of the terminal body.

At least two displays 151 can be provided in the electronic device 100 in accordance with one embodiment of the electronic device 100. For instance, a plurality of displays can be arranged to be spaced apart from each other or to form a single body on a single face of the electronic device 100. Alternatively, a plurality of displays can be arranged on different faces of the electronic device 100. If the display 151 and a sensor for detecting a touch action (hereinafter called 'touch sensor') are configured as a mutual layer structure (hereinafter called 'touch screen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size. If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, the proximity sensor 141 can be provided at an internal area of the electronic device 100 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. In addition, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 152 functions in various modes including a call-receiving mode, a call-placing mode, a recording mode, a voice recognition mode, and a broadcast reception mode to output audio data which is received from the wireless communication unit 110 or is stored in the memory 170. During operation, the audio output module 152 outputs audio relating to a particular function (e.g., call received, message received). The audio output module 152 may be implemented using one or more speakers, buzzers, other audio producing devices, and combinations of these devices.

An alarm module can also be included and output a signal for announcing the occurrence of a particular event associated with the electronic device 100. Typical events include a call received, a message received and a touch input received. The alarm module can output a signal for announcing the event occurrence by way of vibration as well as video or audio signal. The video or audio signal can be output via the display 151 or the audio output module 152. Hence, the display 151 or the audio output module 152 can be regarded as a part of the alarm module.

The haptic module 153 generates various tactile effects that can be sensed by a user. Vibration is a representative one of the tactile effects generated by the haptic module 153. The strength and pattern of the vibration generated by the haptic module 153 are controllable. For instance, different vibrations can be output by being synthesized together or can be output in sequence.

The haptic module 153 can generate various tactile effects as well as the vibration. For instance, the haptic module 153 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 153 can be implemented to enable a user to sense the tactile effect through a muscle sense of a finger or an arm as well as to transfer the tactile effect through direct contact. Optionally, at least two haptic modules 154 can be provided in the electronic device 100 in accordance with an embodiment of the electronic device 100. The light output module 154 can be an LED, for example, and configured to output light and includes a projector.

The memory 170 is generally used to store various types of data to support the processing, control, and storage requirements of the electronic device 100. Examples of such data include program instructions for applications operating on the electronic device 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 170. Moreover, data for various patterns of vibration and/or sound output in response to a touch input to the touch screen can be stored in the memory 170.

The memory 170 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the electronic device 100 can operate in association with a web storage for performing a storage function of the memory 170 on the Internet.

The interface unit 160 may be implemented to couple the electronic device 100 with external devices. The interface unit 160 receives data from the external devices or is supplied with power and then transfers the data or power to the respective elements of the electronic device 100 or enables data within the electronic device 100 to be transferred to the external devices. The interface unit 160 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the electronic device 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the electronic device 100 via the corresponding port.

When the electronic device 100 is connected to an external cradle, the interface unit 160 becomes a passage for supplying the electronic device 100 with a power from the cradle or a passage for delivering various command signals input from the cradle by a user to the electronic device 100. Each of the various command signals input from the cradle or the power can operate as a signal enabling the electronic device 100 to recognize that it is correctly loaded in the cradle.

The controller 180 typically controls the overall operations of the electronic device 100. For example, the controller 180 performs the control and processing associated with voice calls, data communications, and video calls. The controller 180 can include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touch screen as characters or images, respectively.

The power supply unit 190 provides power required by various components of the electronic device 100. The power may be internal power, external power, or combinations of internal and external power. Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 170, and executed by a controller or processor, such as the controller 180.

Figure 2:
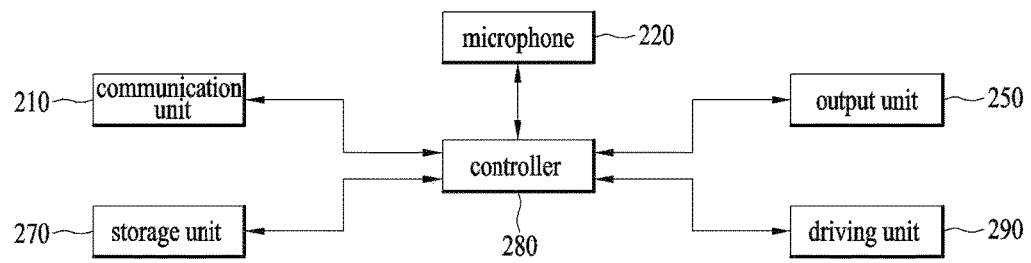
FIG. 2 is a block diagram illustrating the configuration of an electronic device according to one embodiment of the present invention.

Next, FIG. 2 is a block diagram illustrating the configuration of an electronic device according to one embodiment of the present invention. Referring to FIG. 2, an electronic device 200 may include a communication unit 210, a microphone 220, an output unit 250, a storage unit 270, a controller 280 and a driving unit 290. Some of the components included in the electronic device 200 may be removed or other components may be further included therein. The electronic device 200 may include the former electronic device 100, whereby some of the components of the former electronic device 100 may be included in the latter electronic device 200.

The communication unit 210 may include at least one module capable of enabling a wireless communication between the electronic device 200 and a wireless or wired communication system, between the electronic device 100 and another electronic device 100/200, or between the electronic device 200 and an external server. In addition, the communication unit 210 may correspond to the former wireless communication unit 110.

The microphone 220 processes a voice signal into electrical data. For instance, the microphone 220 can include a voice obtaining microphone configured to receive a voice signal including a noise at a first level and a noise obtaining microphone configured to receive a voice signal including a noise at a second level higher than the first level. Moreover, the microphone 220 may include a plurality of voice obtaining microphones and a plurality of noise obtaining microphones. The microphone 220 may correspond to the former microphone 122.

The output unit 250 may include a display unit configured to output an image or video and an audio output unit configured to output an audio or sound. The display unit may display (or output) information processed by the electronic device 200. For example, the display unit may display a running screen information of an application program currently run in the electronic device 200 or UI/GUI (user interface/graphic user interface) information according to the running screen information. Also, the display unit may correspond to the former display unit 151.

The audio output unit can output various audio data. For instance, the audio output unit 252 can output an audio signal related to a function performed in the electronic device 200. Also, the audio output unit may correspond to the former audio output module 152.

The storage unit 270 can store data for supporting various functions of the electronic device 200. For instance, the storage unit 270 can store data for a function corresponding to a recognized voice. The storage unit 270 may correspond to the former memory 170.

The controller 280 controls an operation related to an application program and overall operations of the electronic device 200. For instance, the controller 280 can estimate a noise at a second level from a voice signal received by the noise obtaining microphone, eliminate a nose at a first level from the voice signal received by the voice obtaining microphone, and perform an operation corresponding to the voice signal from which the noise at the first level has been eliminated. The controller 280 may include at least one processor and correspond to the former controller 180.

The driving unit 290 can drive the electronic device 200 to move. Hence, the electronic device 200 can move in response to the drive of the driving unit 290. For instance, the driving unit 290 may include at least one motor and drive the electronic device 200 to move by operating the included motor.

Figure 3:
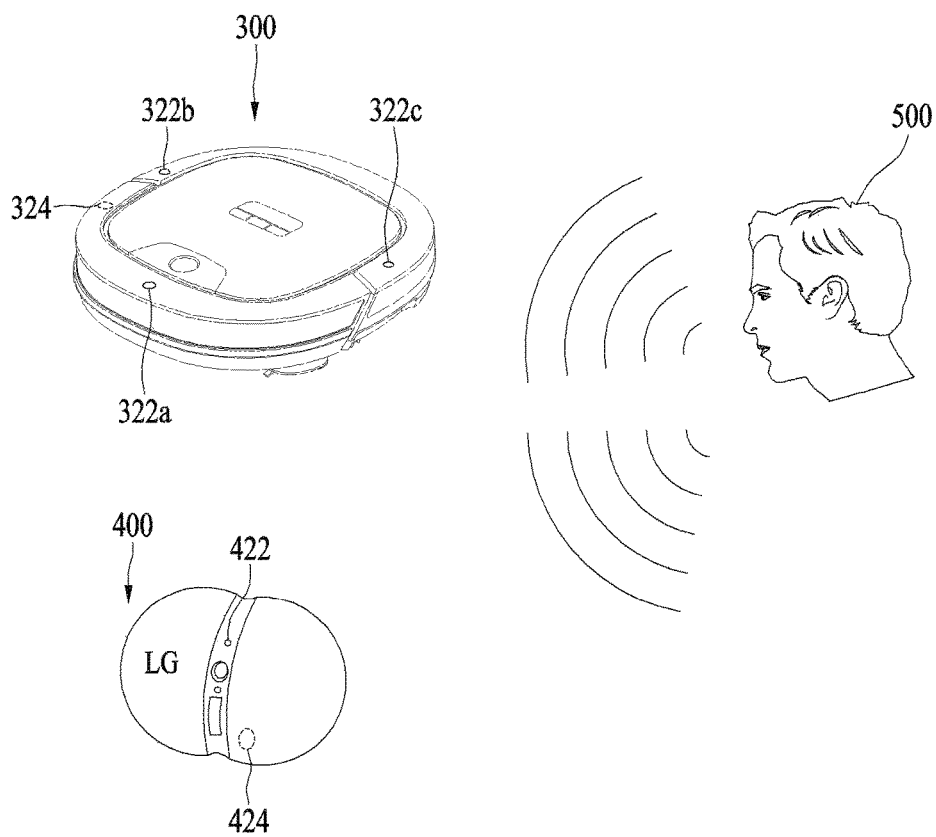
FIG. 3 is a perspective diagram of an electronic device according to one embodiment of the present invention.

FIG. 3 is a perspective diagram of an electronic device according to one embodiment of the present invention. Referring to FIG. 3, an electronic device 300/400 may have a body of a curved cylindrical shape, by which the present invention is not limited. For example, the body can have a bar shape, an oval shape, a ball shape, an animal shape, a humanoid shape similar to a human shape, or the like.

The electronic device 300/400 may include at least one case (e.g., frame, housing, cover, etc.) configuring an exterior of the electronic device 300/400. For instance, the electronic device 300/400 may include a first case of a top side and a second case of a bottom side. Various electronic parts may be disposed in an inner space formed by coupling the first and second cases together. The disposed electronic parts include at least one of the aforementioned components.

A display unit is disposed on a front side of the electronic device 300/400 to output information. For instance, a window of the display unit is installed in the first case to configure a portion of a front side of the electronic device body together with the first case.

A camera and a microphone can be disposed on the front side of the electronic device 300/400. In this instance, the microphone may include a plurality of microphones. For instance, a voice obtaining microphone 322/422 and a noise obtaining microphone 324/424 may be disposed within the electronic device 300/400. In a first case region having the voice obtaining microphone 322/422 disposed therein, a via hole for receiving an external voice signal may be formed. Yet, in the first case region having the noise obtaining microphone 324/424 disposed therein, a via bole may not be formed. The reason for this is to raise a reception rate of a voice signal externally received by the voice obtaining microphone 322/422 and a reception rate of a noise signal internally received by the noise obtaining microphone 324/424.

The electronic device 300 may include a multitude of voice obtaining microphones 322 such as first to third voice obtaining microphones 322a, 322b and 322c and the like and a single noise obtaining microphone 324. In some cases, the electronic device 300 may include a multitude of voice obtaining microphones 322 and a multitude of noise obtaining microphones 324. Further, the electronic device 400 may include a single voice obtaining microphone 422 and a single noise obtaining microphone 424.

Thus, if the electronic device 300/400 receives a voice command of a user 500, to the device 300/400 can perform an operation according to the voice command recognized by eliminating noise included in the received voice signal.

Hence, the electronic device 300/400 disposes the voice obtaining microphone 322/422 to receive a voice signal at a low noise level and also disposes the noise obtaining microphone 324/424 to receive a voice signal at a high noise level, thereby easily eliminating the noise from the voice signal by raising a signal-to-noise ratio (SNR). For instance, the voice obtaining microphone 322/422 can be disposed far away from the noise source that generates noise. Also, the noise obtaining microphone 324/424 can be disposed adjacent to the noise source. Moreover, in order not to receive the noise from the noise source, the voice obtaining microphone 322/422 is covered with a cover containing a sound absorbing material to cut off noise. In order to receive the noise of the noise source well, the noise obtaining microphone 324/424 can be disposed open.

Figure 4:
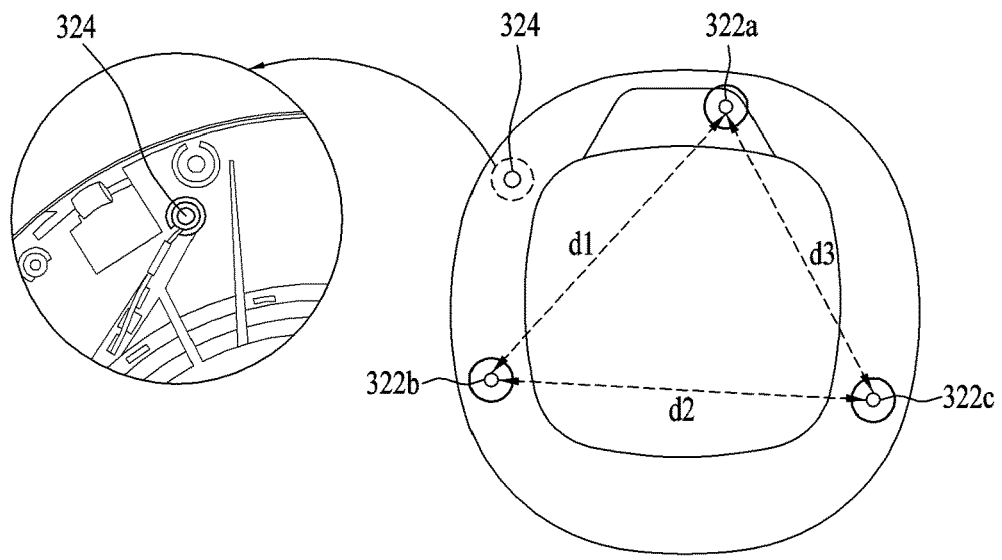
FIG. 4 is a diagram illustrating a microphone location of an electronic device.

FIG. 4 is a diagram illustrating a location of a microphone in an electronic device. Referring to FIG. 4, an electronic device according to an embodiment of the present invention may include at least one voice obtaining microphone 322 and at least one noise obtaining microphone 324. In this instance, the voice obtaining microphone 322 can receive a voice signal containing a noise at a first level. Also, the noise obtaining microphone 324 can receive a voice signal containing a noise at a second level higher than the first level.

For instance, if a single voice obtaining microphone 322 and a single noise obtaining microphone 324 are disposed, the voice obtaining microphone 322 is disposed closest to a noise source for generating noise and the noise obtaining microphone 324 can be disposed farthest away from the noise source for generating noise. The reason for this is to easily eliminate a noise from a voice signal by raising a signal-to-noise ratio (SNR) of a signal received from the noise obtaining microphone 324.

Hence, a controller estimates the noise at the second level from the voice signal received by the noise obtaining microphone 324, and can eliminate the noise at the first level from the voice signal received by the voice obtaining microphone 322 based on the estimated noise. Further, since the voice signal received by the noise obtaining microphone 324 has the highest noise level, it is advantageous for the noise estimation.

Since the voice signal received by the voice obtaining microphone 322 has the lowest noise level, it is advantageous for the noise elimination based on the estimated noise. In particular, the controller estimates the noise from the voice signal received by the noise obtaining microphone 324 and eliminates the noise from the voice signal received by the voice obtaining microphone 322. Hence, as a voice recognition rate is improved, the controller can accurately perform an operation corresponding to a voice command.

When a multitude of voice obtaining microphones 322 are provided, they may be spaced apart from each other in equal distances. In some cases, the voice obtaining microphones 322 may be spaced apart from each other in different distances.

The voice obtaining microphone 322, as shown in FIG. 4, may include first to third voice obtaining microphones 322a, 322b and 322c and can be disposed on an inner edge of a top plate of the electronic device by being spaced apart from each other in predetermined distances. In particular, if the first and second voice obtaining microphones 322a and 322b are disposed in a first distance d1 and the second and third voice obtaining microphones 322b and 322c are disposed in a second distance d2, the first and third voice obtaining microphones 322a and 322c can be disposed in a third distance d3. Hence, the first to third distances may be equal to or different from one another. For instance, the first to third voice obtaining microphones 322a, 322b and 322c may be disposed in a triangular configuration to enable a sound source direction search, by which the present invention is non-limited.

A prescribed one of the first to third voice obtaining microphones 322a, 322b and 322c is sealed with a cover containing a sound absorbing material, thereby cutting off the reception of noise to the maximum. In this instance, if the voice obtaining microphone sealed with the sound absorbing material contained cover is the first voice obtaining microphone 322a, while the electronic device is operating, the controller can recognize a voice command by eliminating a noise of a voice signal received from the first voice obtaining microphone 322a. While the electronic device stops, the controller can recognize a voice command through voice signals received from the second and third voice obtaining microphones 322b and 322c. In particular, while the electronic device is operating, the first voice obtaining microphone 322a is used for the voice recognition. While the electronic device stops, the second and third voice obtaining microphones 322b and 322c can be used for the voice recognition.

The reason for this is described as follows. First of all, while the electronic device is operating, since it is an environment at a high noise level, a noise level of a voice signal received from the first voice obtaining microphone 322a is lower than that of a voice signal received from each of the second and third voice obtaining microphones 322b and 322c. While the electronic device stops, since it is an environment having a low noise level, a level of a voice signal received from each of the second and third voice obtaining microphones 322b and 322c is higher than that of a voice signal received from the first voice obtaining microphone 322a.

In some cases, since each of the first to third voice obtaining microphones 322a, 322b and 322c is sealed with a cover containing a sound absorbing material, noise reception may be cut off to the maximum. Further, irrespective of an operation or stop of the electronic device, among the voice signals received from the first to third voice obtaining microphones 322a, 322b and 322c, the voice signal having the lowest noise level can be used for the voice recognition.

The noise obtaining microphone 324 may be disposed on an inner edge of the top plate of the electronic device. Also, the noise obtaining microphone 324 may be disposed near the noise source. The noise obtaining microphone 324, as shown in FIG. 4, may be disposed in a seat recess formed in an inner side of the top plate. Since one side of the seat recess is open in a noise source direction, the noise obtaining microphone 324 can receive a voice signal including a high-level noise. In this instance, when the electronic device is operating, the controller estimates a noise of a voice signal received from the noise obtaining microphone 324.

While the electronic device stops, the controller may not estimate the nose of the voice signal received from the noise obtaining microphone 324. In particular, while the electronic device is operating, the noise obtaining microphone 324 may be used for the noise estimation. While the electronic device stops, the noise obtaining microphone 324 may not be used for the noise estimation.

The reason for this is described as follows. First of all, while the electronic device is operating, since it is an environment on a high noise level, the noise of the voice signal received from the voice obtaining microphone 322 is eliminated by estimating the noise of the voice signal received from the noise obtaining microphone 324. Yet, while the electronic device stops, since it is an environment on a low noise level, it is not necessary to eliminate the noise of the voice signal received from the voice obtaining microphone 322.

In some cases, if a multitude of the noise obtaining microphones 324 are provided, the controller can use a voice signal at a highest noise level among voice signals received from a multitude of the noise obtaining microphones 324 for the noise estimation.

Figure 5:
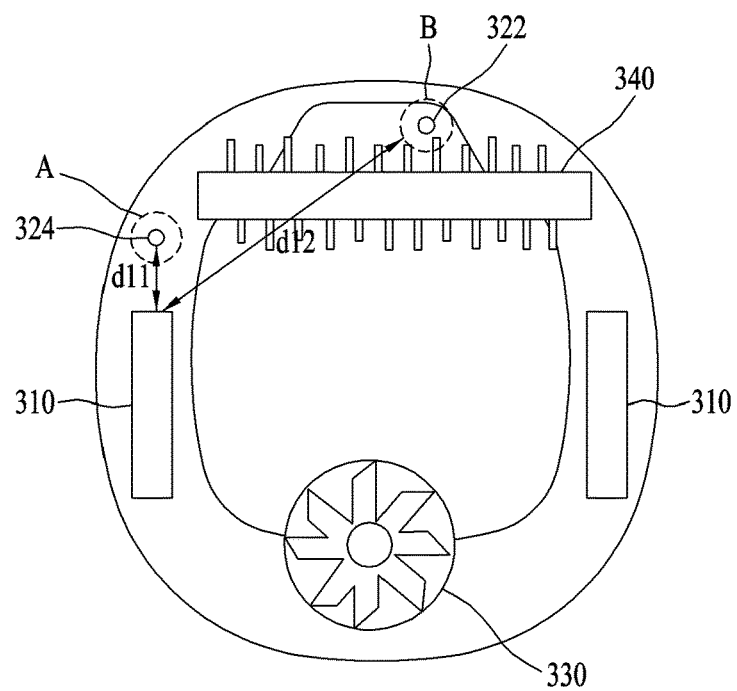
FIG. 5 and FIG. 6 are diagrams of a noise obtaining microphone and a voice obtaining microphone of an electronic device.
Figure 6:
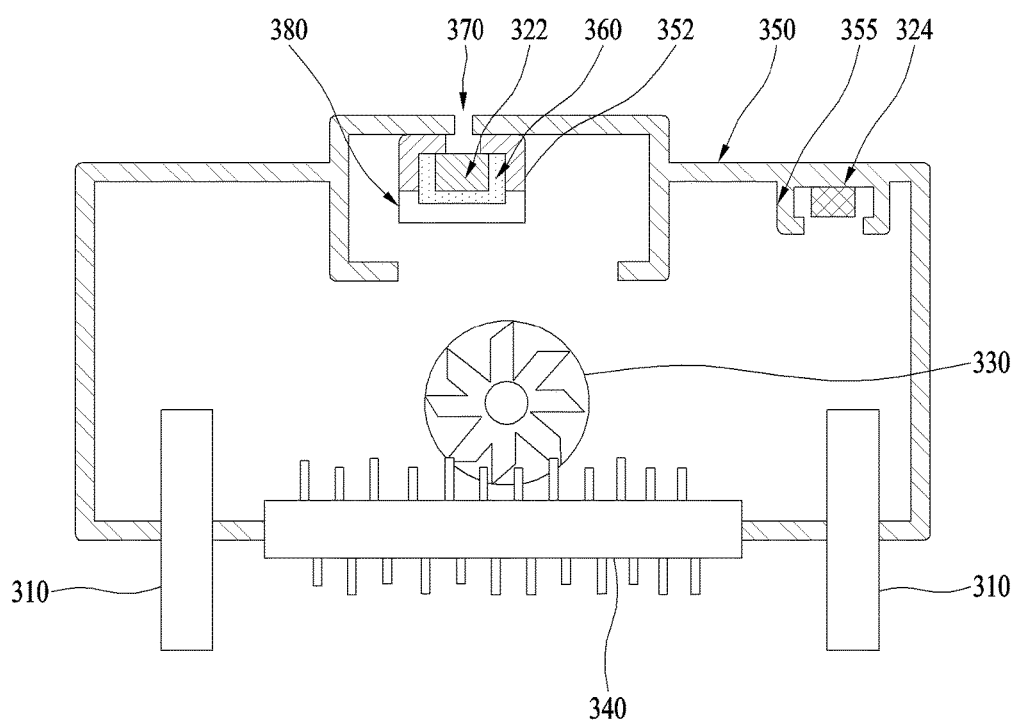

FIG. 5 and FIG. 6 are diagrams of a noise obtaining microphone and a voice obtaining microphone of an electronic device. FIG. 5 is a diagram of a top view illustrating an inside of a robot cleaner, while FIG. 6 is a diagram of a lateral view of the inside of the robot cleaner.

Referring to FIG. 5 and FIG. 6, a robot cleaner may include a body unit 350 configuring an exterior, a roller 310 configured to move the robot cleaner, a cleaning brush 340 configured to collect dust, a suction 330 configured to suck dust, a voice obtaining microphone 322 configured to receive a voice signal including a noise at a first level, a noise obtaining microphone 324 configured to receive a voice signal including a noise at a second level higher than the first level, and a controller configured to control these components. In this instance, the controller estimates the noise at the second level from the voice signal received by the noise obtaining microphone 324, eliminates the noise at the first level from the voice signal received by the voice obtaining microphone 322 based on the estimated noise, and can perform an operation corresponding to the voice signal from which the noise at the first level has been eliminated.

The voice obtaining microphone 322 is disposed in a first distance from a noise source from which noise is generated, and the noise obtaining microphone 324 is disposed in a second distance from the noise source generating the noise. In this instance, the first distance may be longer than the second distance. For instance, if the roller 310 is the noise source, the noise obtaining microphone 324 is disposed on a region A adjacent to the roller 310 in a distance d11 from the roller 310 generating the noise, while the voice obtaining microphone 322 is disposed on a region B distant from the roller 310 in a distance d12 from the roller generating the noise. In this instance, the distance d12 is longer than the distance d11.

On an inner side of the body unit 350 of the robot cleaner, a first seat recess 352 having the voice obtaining microphone 322 seated thereon and a second seat recess 355 having the noise obtaining microphone 324 seated thereon can be disposed. In this instance, regarding the first seat recess 352, one side toward an inner direction of the body unit 350 is sealed with a cover 380 and a via hole 370 opening into an external environment can be formed in the other side toward an outer direction of the body unit 350. Also, the first seat recess 352 having the voice obtaining microphone 322 seated thereon can be filled up with a sound absorbing material 360. Moreover, regarding the second seat recess 355 having the noise obtaining microphone 324 seated thereon, one side toward an inner direction of the body unit 350 is open but the other side toward an outer direction of the body unit 350 may be closed. In this instance, the open direction of one side of the second seat recess 355 may face the noise source from which noise is generated. For instance, if the noise source is the roller 310, the open direction of one side of the second seat recess 355 may face the roller 310 from which the noise is generated.

Therefore, the voice obtaining microphone 322 can minimize the reception of noises (e.g., cleaning noise, vibration noise, etc.) generated internally. Also, the noise obtaining microphone 324 can maximize the reception of noises (e.g., cleaning noise, vibration noise, etc.) generated internally.

Figure 7:
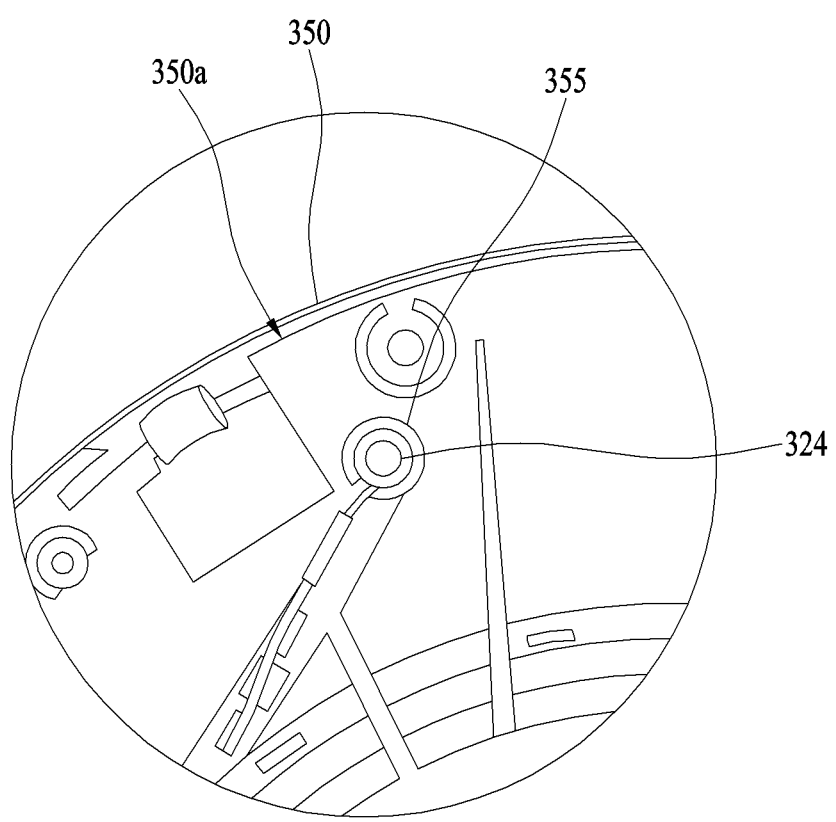
FIG. 7 and FIG. 8 are diagrams illustrating a shielding process of a voice obtaining microphone.
Figure 8:
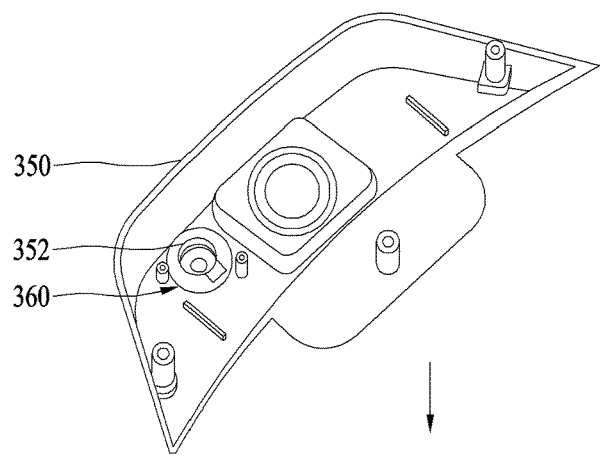
Figure 8:
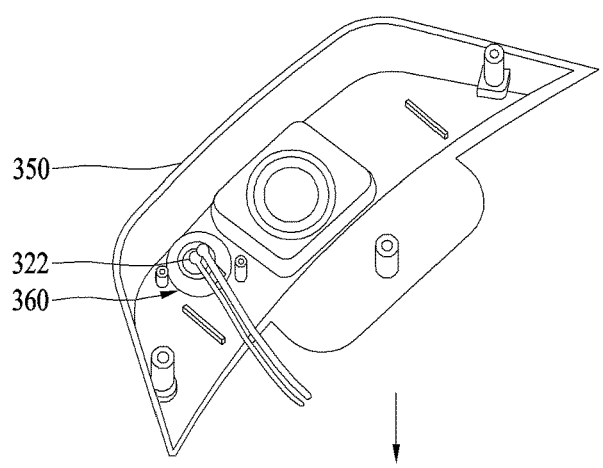
Figure 8:
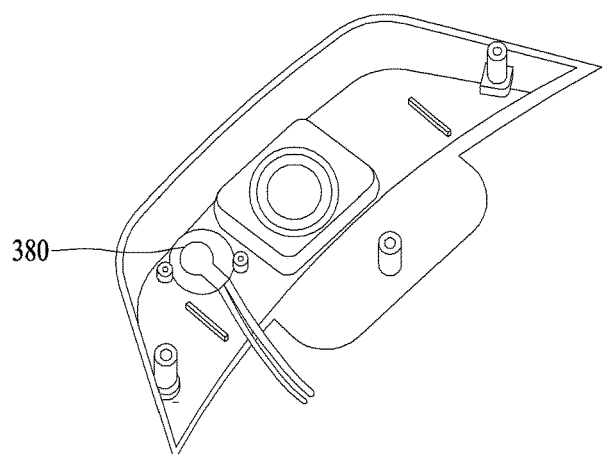

FIG. 7 and FIG. 8 are diagrams illustrating a shielding process of a voice obtaining microphone. Referring to FIG. 7 and FIG. 8, a first seat recess 352 can be formed on an inner lateral side 350a of a body unit 350 of an electronic device. In this instance, one side of the first seat recess 352 toward an inner direction of the body unit 350 is open and a via hole opening into an external environment can be formed in the other side of the first seat recess 352 toward an outer direction of the body unit 350. Also, a periphery of the first seat recess 352 can be filled up with a sound absorbing material 360 such as a sponge or the like. After a voice obtaining microphone 322 has been seated on the first seat recess 352, the first seat recess 352 having the voice obtaining microphone 322 seated thereon is covered with a sound absorbing cover 380. Also, the sound absorbing cover 380 can be fixed to an inner side 350a of the body unit 350. Hence, the voice obtaining microphone 322 can minimize the reception of noises (e.g., cleaning noise, vibration noise, etc.) generated internally.

Figure 9:
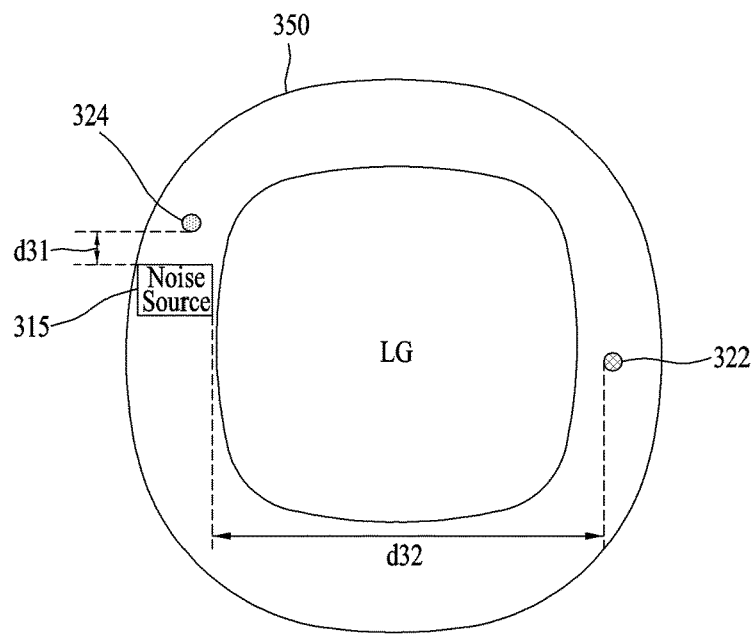
FIG. 9 is a diagram describing a distance relation between a noise source and a microphone.

FIG. 9 is a diagram describing a distance relation between a noise source and a microphone. Referring to FIG. 9, a voice obtaining microphone 322 is disposed in a distance d32 from a noise source 315 generating noise and a noise obtaining microphone 324 is disposed in a distance d31 from the noise source 315 generating the noise. In this instance, the distance d32 may be longer than the distance d31. In particular, the noise obtaining microphone 324 is preferably disposed closest to the noise source 315 generating the noise, and the voice obtaining microphone 322 is preferably disposed farthest from the noise source 315 generating the noise. If a multitude of the noise sources 315 are provided, the noise obtaining microphone 324 can be preferably disposed closest to the noise source 315 having a highest noise level, and the voice obtaining microphone 322 can be preferably disposed farthest from the noise source 315 having the highest noise level.

Figure 10A:
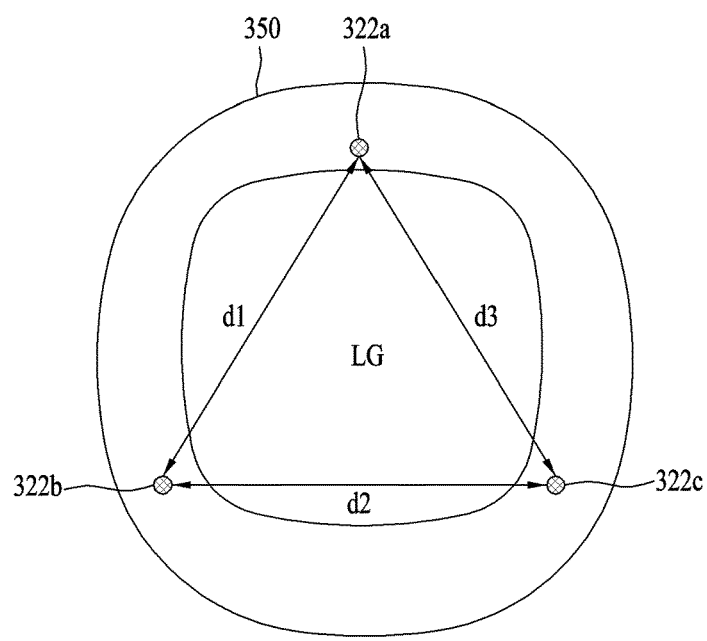
FIG. 10A and FIG. 10B are diagrams describing a distance relation between microphones.
Figure 10B:
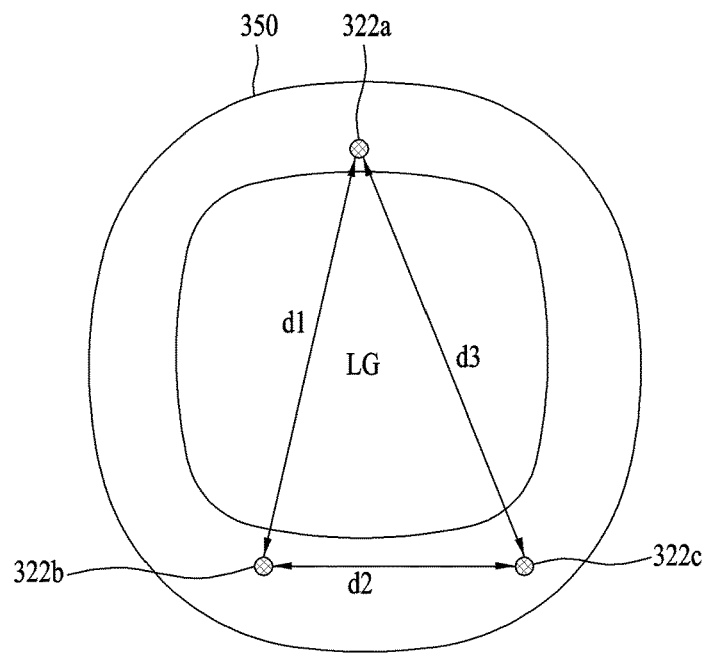

Next, FIG. 10A and FIG. 10B are diagrams describing a distance relation between microphones. Referring to FIG. 10A and FIG. 10B, a multitude of voice obtaining microphones 322 can be disposed by being spaced apart from each other in prescribed distances. In this instance, when a multitude of the voice obtaining microphones 322 are provided, as shown in FIG. 10A, they can be spaced apart from each other in equal distances. Alternatively, the voice obtaining microphones 322, as shown in FIG. 10B, can be spaced apart from each other in different distances.

For instance, if the first and second voice obtaining microphones 322a and 322b are disposed in a first distance d1 and the second and third voice obtaining microphones 322b and 322c are disposed in a second distance d2, the first and third voice obtaining microphones 322a and 322c can be disposed in a third distance d3. In this instance, the first to third distances can be equal to or different from one another (FIG. 10A, FIG. 10B). Moreover, the first to third voice obtaining microphones 322a, 322b and 322c can be disposed in a triangular configuration to enable a sound source direction search, by which the present invention is non-limited.

Thus, if the electronic device moves, the controller eliminates a noise at a first level from a voice signal received by a preset specific one of a multitude of the voice obtaining microphones and can perform an operation corresponding to the voice signal from which the noise at the first level is eliminated. If the electronic device stops, the controller can perform an operation corresponding to a voice signal received from one of a multitude of the voice obtaining microphones except the specific voice obtaining microphone.

Besides, a multitude of noise obtaining microphones can be disposed in prescribed distances (not shown in the drawing). When a multitude of the noise obtaining microphones are provided, they may be spaced apart from each other in equal distances. In some cases, the noise e obtaining microphones may be spaced apart from each other in different distances. This can be designed variously according to locations of a noise source.

Figure 11:
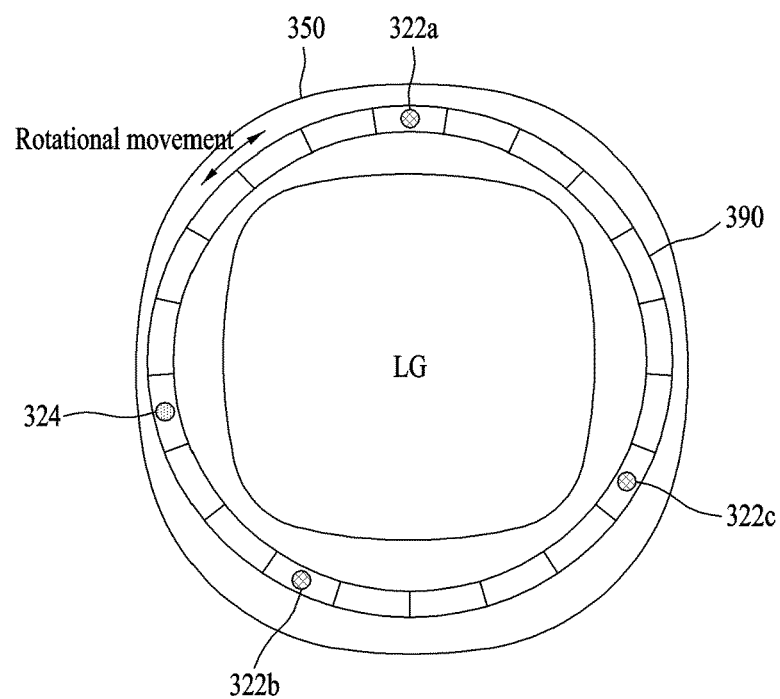
FIG. 11 and FIG. 12 are diagrams describing an electronic device having a movable microphone.
Figure 12:
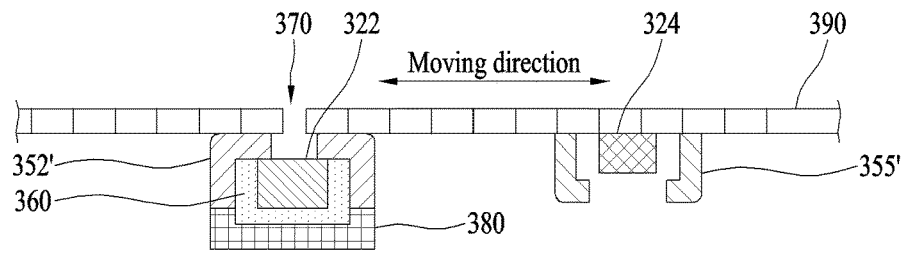

FIG. 11 and FIG. 12 are diagrams describing an electronic device having a movable microphone. An electronic device according to an embodiment of the present invention may use a fixed microphone or a movable microphone shown in FIG. 11 and FIG. 12. The electronic device including the movable microphone may include a body unit 350 configuring an exterior of the electronic device and a rotational frame 390 configured to rate along a circumference of the body unit 350 by being coupled with the body unit 350. In the rotation frame 390, a third seat recess 352' having a voice obtaining microphone 322 seated thereon and a fourth seat recess 355' having a noise obtaining microphone 324 seated thereon can be disposed. In this instance, one side of the third seat recess 352' toward an inner direction of the body unit 350 is sealed with a cover 380 and a via hole opening into an external environment can be formed in the other side of the third seat recess 352' toward an outer direction of the body unit 350.

Also, the third seat recess 352' having the voice obtaining microphone 322 seated thereon can be filled up with a sound absorbing material 360. Moreover, regarding the fourth seat recess 355' having the noise obtaining microphone 324 seated thereon, one side of the fourth seat recess 355' toward an inner direction of the body unit 350 may be open and the other side of the fourth seat recess 355' toward an outer direction of the body unit 350 may be closed. In this instance, the open direction of one side of the fourth seat recess 355' may face a noise source from which noise is generated.

Meanwhile, based on a noise level of a voice signal received from the noise obtaining microphone 324, the controller can move the noise obtaining microphone 324 in a direction on a highest noise level by rotating the rotational frame 390.

Figure 13:
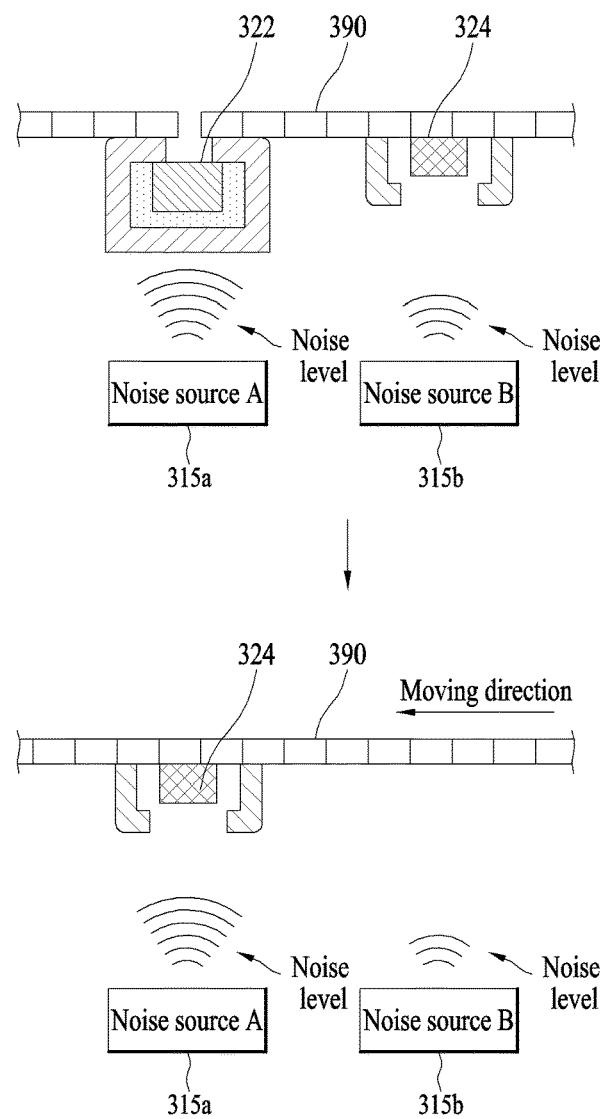
FIG. 13 is a diagram illustrating a rotational movement of a microphone according to a noise level.

FIG. 13 is a diagram illustrating a rotational movement of a microphone according to a noise level. Referring to FIG. 13, a controller of an electronic device rotates a rotational frame 390 having a noise obtaining microphone 324 disposed therein. Each time the noise obtaining microphone 324 is rotationally moved by a prescribed distance, the controller measures a noise level from a voice signal received by the noise obtaining microphone 324. If 1 rotational operation of the rotational frame 390 is completed, the controller can rotationally move the noise obtaining microphone 324 in a direction on a highest noise level based on the measured noise level. The reason for moving the noise obtaining microphone 324 near the noise source on the highest noise level is to facilitate a noise measurement by raising a signal-to-noise ratio (SNR). In particular, the electronic device according to an embodiment of the present invention estimates a noise by raising an SNR of a signal received from the noise obtaining microphone 324, thereby easily eliminating a noise of a voice signal received from the voice obtaining microphone 322.

The controller, as shown in FIG. 13, measures a noise level from a voice signal received by the noise obtaining microphone 324 by rotating the rotational frame 390. If a noise level of a noise source A 315a is higher than that of a noise source B 315b, the controller can move the noise obtaining microphone 324 to a location near the noise source B 315b by rotating the rotational frame 390.

Moreover, although the electronic device according to an embodiment of the present invention can rotationally move the noise obtaining microphone 324 to correspond to an internal noise source, it can rotationally move the noise obtaining microphone 324 to correspond to an external noise source by disposing a noise obtaining microphone outside the body unit 350. Therefore, although various noises are generated from multiple noise sources, the electronic device according to an embodiment of the present invention can easily eliminate a noise of a voice signal, thereby raising a voice recognition rate.

Figure 14:
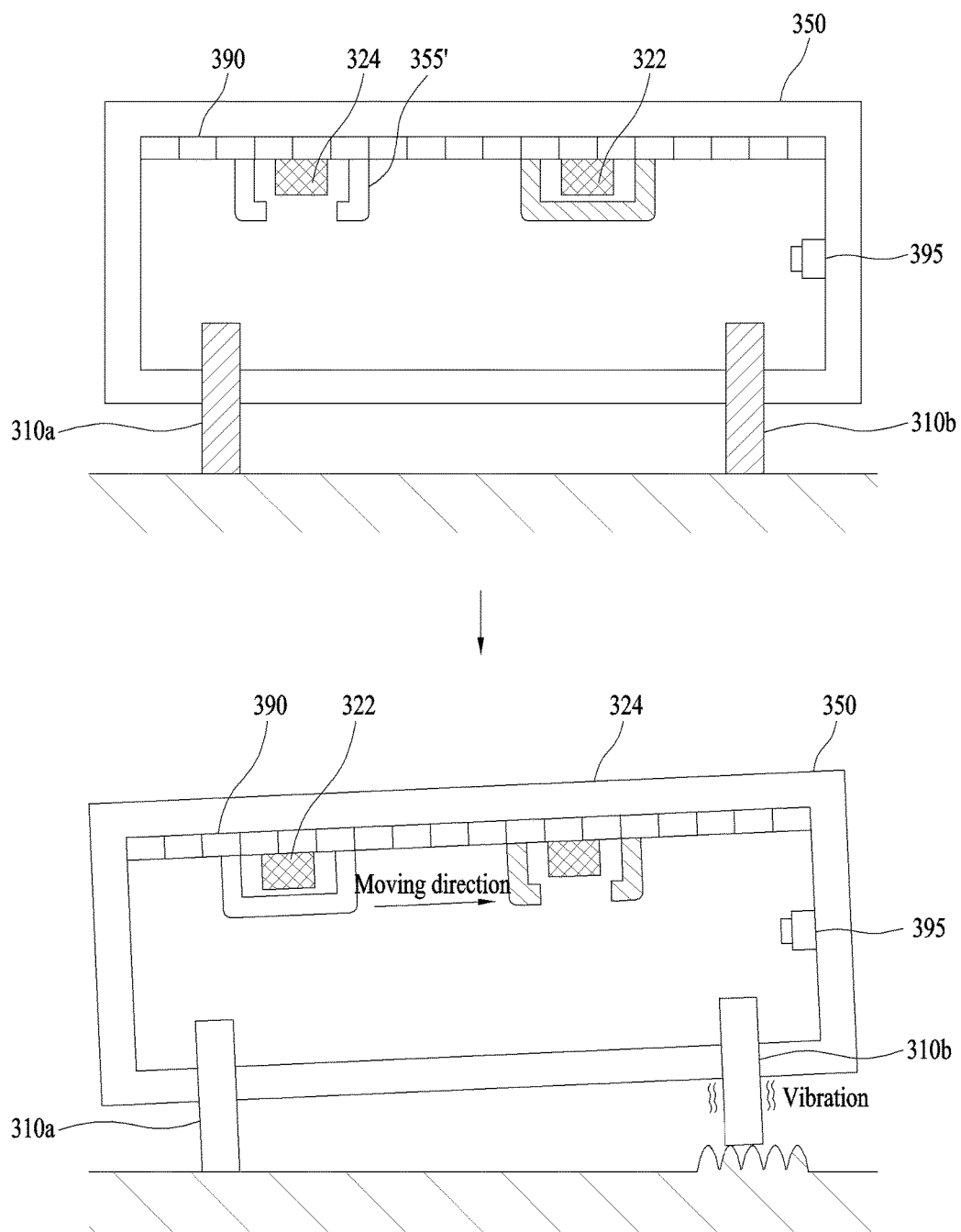
FIG. 14 is a diagram illustrating a movement of a noise obtaining microphone according to vibration.

FIG. 14 is a diagram illustrating a movement of a noise obtaining microphone according to vibration. Referring to FIG. 14, an electronic device including a movable microphone may include a body unit 350 configuring an exterior of the electronic device and a rotational frame 390 configured to rate along a circumference of the body unit 350 by being coupled with the body unit 350. In the rotation frame 390, a third seat recess 352' having a voice obtaining microphone 322 seated thereon and a fourth seat recess 355' having a noise obtaining microphone 324 seated thereon can be disposed. Also, the electronic device may include a vibration sensor 395 configured to sense vibration of the body unit 350 by being disposed in the body unit 350.

Meanwhile, based on the vibration strength sensed by the vibration sensor 395, the controller rotates the rotational frame 390 so as to move the noise obtaining microphone 324 close to a moving unit configured to the electronic device as close as possible. In this instance, if the vibration strength is equal to or greater than a preset reference, the controller rotates the rotational frame 390 so as to move the noise obtaining microphone 324 to the moving unit for moving the electronic device as close as possible. If the vibration strength is smaller than the preset reference, the controller can ignore the sensed vibration strength. For instance, the moving unit for moving the electronic device may include at least one roller 310a and 310b.

If a ground is flat, as shown in FIG. 14, the electronic device moved by the roller 310 barely has vibration. If the ground is uneven, the electronic device may generate a vibration noise due to the vibration of the roller 310. Further, the controller measures a vibration strength from the vibration sensor 395. If determining that a vibration noise is generated from the roller 310b, the controller can move the noise obtaining microphone 324 to the roller 310b as close as possible by rotating the rotational frame 390.

Therefore, although a vibration noise is generated in the course of moving the electronic device, the electronic device according to an embodiment of the present invention can easily eliminate a noise of a voice signal, thereby raising a voice recognition rate.

Figure 15A:
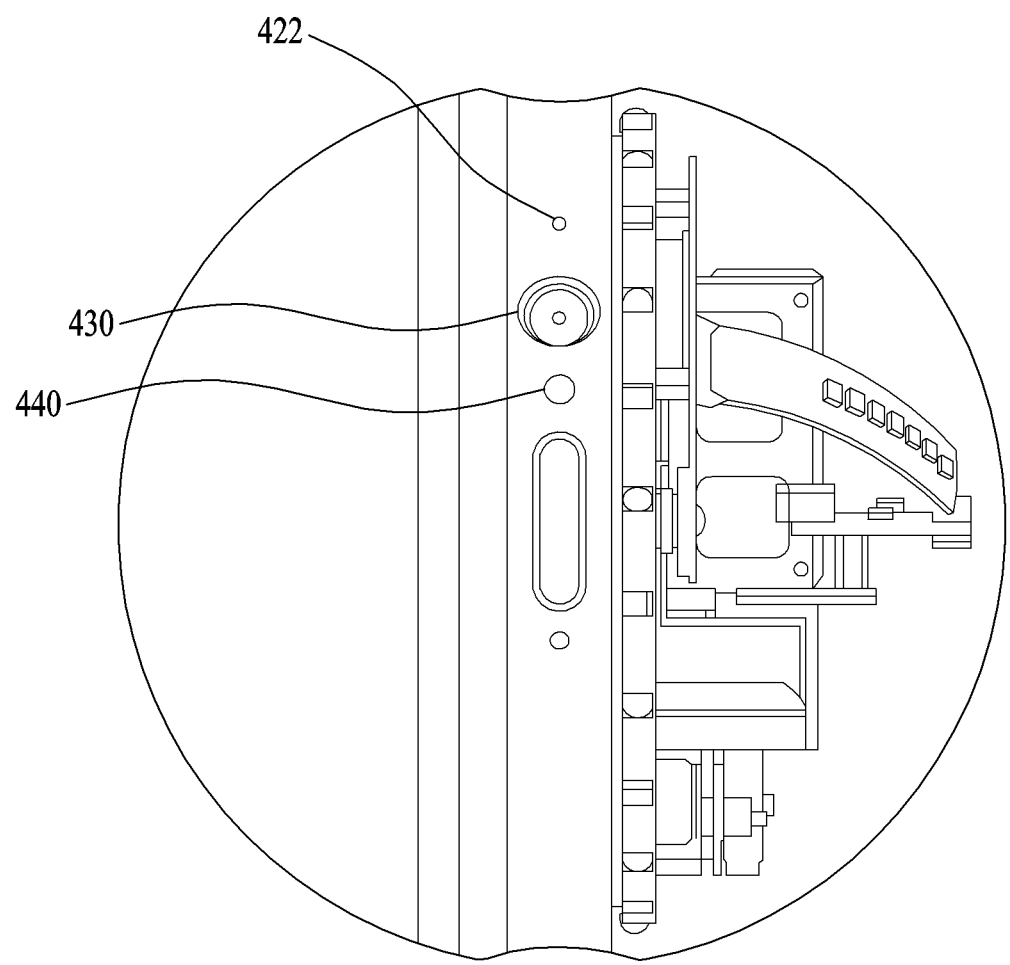
FIG. 15A and FIG. 15B are diagrams illustrating a disposition of a microphone applicable to a movable home robot.
Figure 15B:
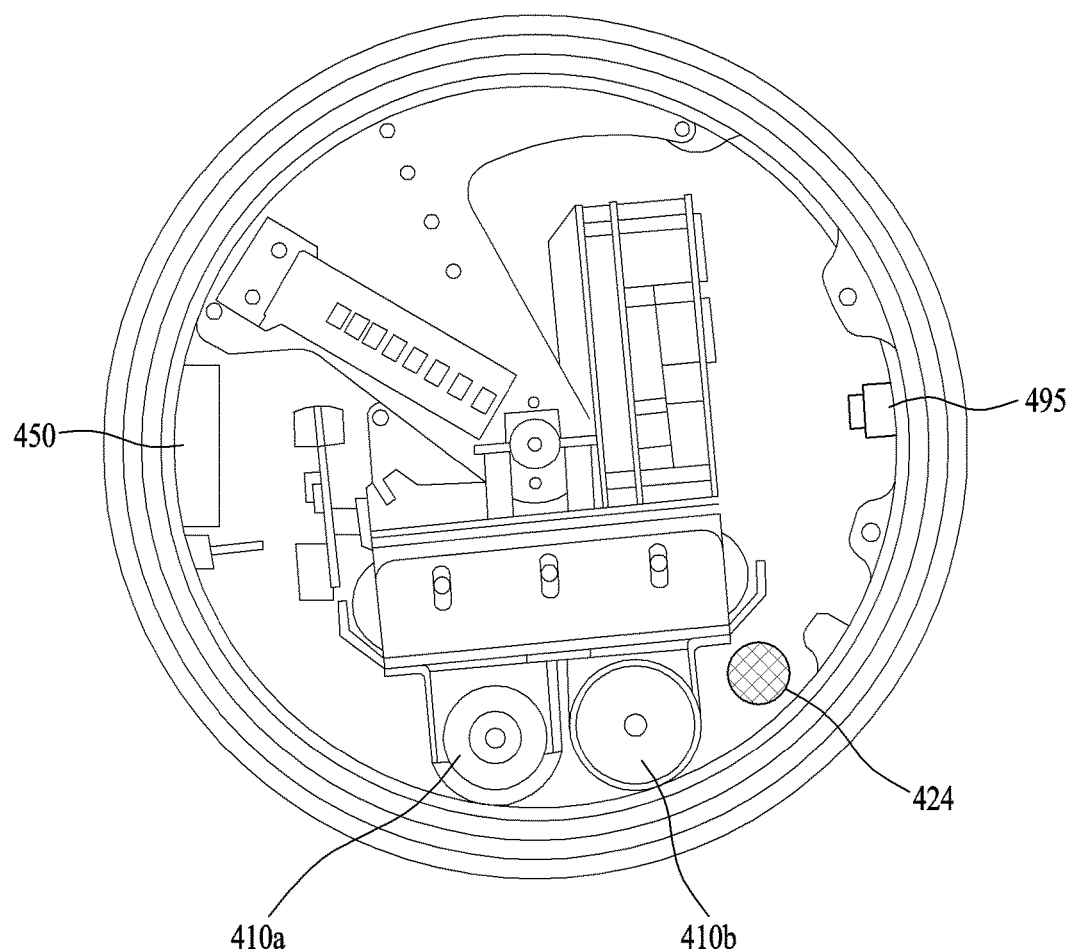

FIG. 15A and FIG. 15B are diagrams to show a disposition of a microphone applicable to a movable home robot. FIG. 15A is a front diagram and FIG. 15B is a lateral inside diagram. Referring to FIG. 15A and FIG. 15B, a movable home robot may include a body unit configuring an exterior, a roller 410 (410a/410b) moving a robot cleaner, a camera 430, an IR (infrared) sensor 440, a distance sensor 450, a vibration sensor 495, a voice obtaining microphone 422 for obtaining a voice signal including a noise at a first level, a noise obtaining microphone 424 for receiving a voice signal including a noise at a second level higher than the first level, and a controller for controlling these components. In this instance, the controller estimates the noise at the second level from the voice signal received by the noise obtaining microphone 424, eliminates the noise at the first level from the voice signal received by the voice obtaining microphone 422 based on the estimated noise, and can perform an operation corresponding to the voice signal from which the noise at the first level has been eliminated.

The voice obtaining microphone 422 is disposed in a first distance from a noise source from which noise is generated, and the noise obtaining microphone 424 is disposed in a second distance from the noise source generating the noise. In this instance, the first distance may be longer than the second distance. For instance, if the roller 410 is the noise source, the noise obtaining microphone 424 is disposed adjacent to the roller 410, while the voice obtaining microphone 422 is disposed on a region distant from the roller 410.

On an inner side of the body unit of the movable home robot, a seat recess having the voice obtaining microphone 422 seated thereon and a seat recess having the noise obtaining microphone 424 seated thereon can be disposed. In this instance, regarding the seat recess, one side toward an inner direction of the body unit is sealed with a cover and a via hole opening into an external environment can be formed in the other side toward an outer direction of the body unit. Also, the first seat recess having the voice obtaining microphone 422 seated thereon can be filled up with a sound absorbing material. Moreover, regarding the seat recess having the noise obtaining microphone 424 seated thereon, one side toward an inner direction of the body unit is open but the other side toward an outer direction of the body unit may be closed. In this instance, the open direction of one side of the seat recess may face the noise source from which noise is generated. For instance, if the noise source is the roller 410, the open direction of one side of the seat recess may face the roller 410 from which the noise is generated.

Therefore, the voice obtaining microphone 422 can minimize the reception of noises generated internally. Also, the noise obtaining microphone 424 can maximize the reception of noises generated internally. Meanwhile, when a multitude of voice obtaining microphones are provided, an electronic device can eliminate a noise at a first level from a voice signal received by a previously specified voice obtaining microphone among a multitude of the voice obtaining microphones. In this instance, the previously specified voice obtaining microphone may include a voice obtaining microphone farthest from a noise source for generating noise.

Moreover, when a multitude of voice obtaining microphones are provided, an electronic device can eliminate a noise at a first level from a voice signal received by a voice obtaining microphone having a lowest noise level as a result from comparing voice signals received from a multitude of the voice obtaining microphones. In addition, when a multitude of noise obtaining microphones are provided, an electronic device can estimate a noise at a second level from a voice signal received by a previously specified noise obtaining microphone among a multitude of the noise obtaining microphones. In this instance, the previously specified voice obtaining microphone may include a voice obtaining microphone located closest to a noise source for generating noise.

In some cases, when a multitude of noise obtaining microphones are provided, an electronic device can estimate a noise at a second level from a voice signal received by a noise obtaining microphone having a highest noise level as a result from comparing voice signals received from a multitude of the noise obtaining microphones.

Figure 16:
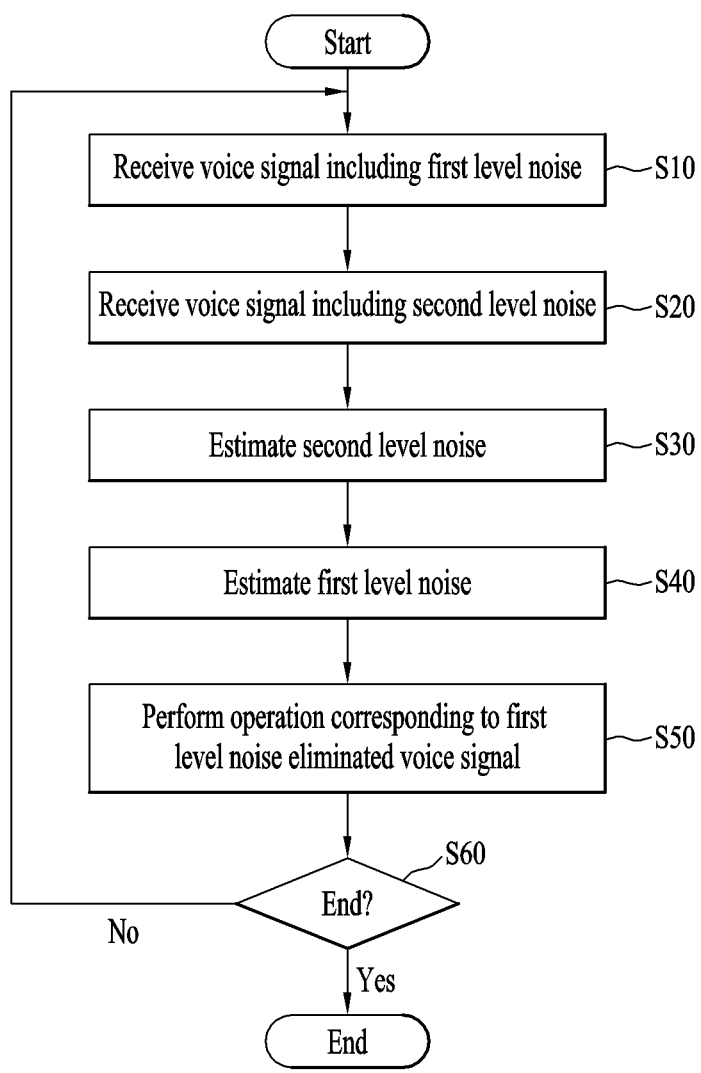
FIGS. 16 to 18 are flowcharts describing a noise eliminating method of an electronic device according to an embodiment of the present invention.
Figure 17:
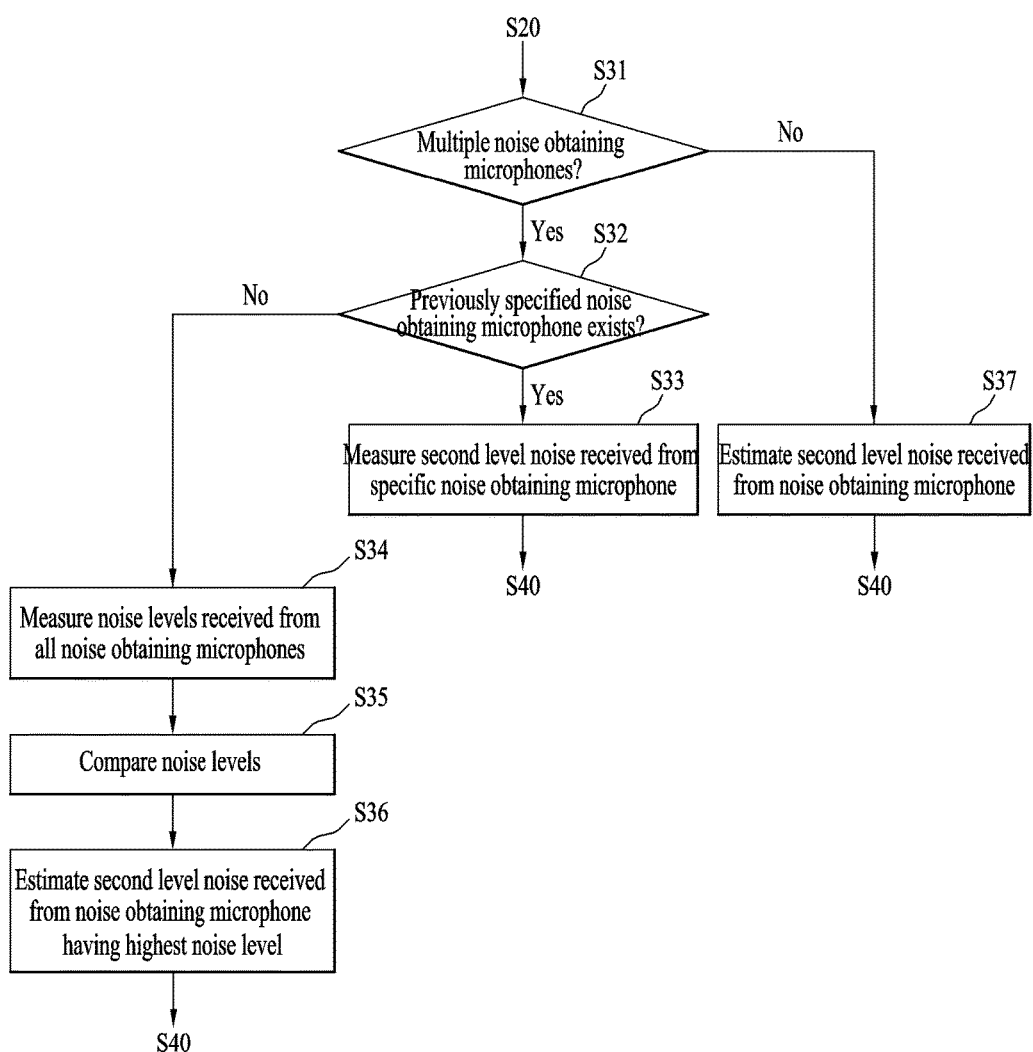
Figure 18:
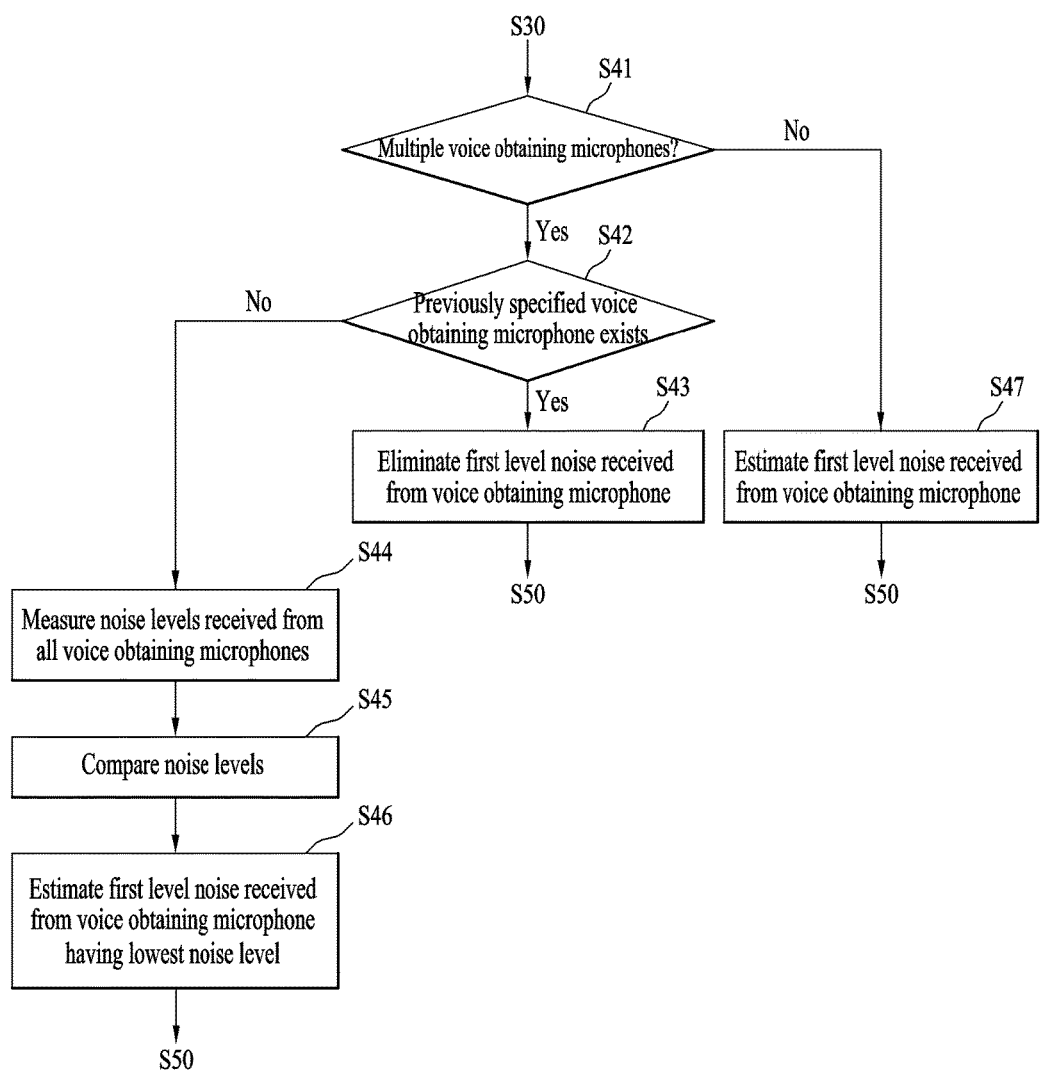

Next, FIGS. 16 to 18 are flowcharts describing a noise eliminating method of an electronic device according to an embodiment of the present invention. Referring to FIGS. 16 to 18, a controller of an electronic device receives a voice signal including a noise at a first level from a voice obtaining microphone (S10).

The controller receives a voice signal including a noise at a second level higher than the first level from a noise obtaining microphone (S20), and estimates the noise at the second level from the voice signal received by the noise obtaining microphone (S30).

Based on the estimated noise, the controller eliminates the noise at the first level from the voice signal received by the voice obtaining microphone (S40). The controller can perform an operation corresponding to the voice signal from which the noise at the first level has been eliminated (S50). Subsequently, if receiving an end request, the controller ends all operations (S60).

Meanwhile, when a multitude of noise obtaining microphones are provided, as shown in FIG. 17, the controller receives the voice signal including the noise at the second level higher than the first level from the noise obtaining microphone (S20) and then checks whether a multitude of the noise obtaining microphones are provided (S31).

If a multitude of the noise obtaining microphones are provided, the controller checks whether a previously specified noise obtaining microphone exists among a multitude of the noise obtaining microphones (S32). If the previously specified noise obtaining microphone exists, the controller estimates the noise at the second level from the voice signal received by the previously specified noise obtaining microphone (S33).

In the step S32 of checking whether a previously specified noise obtaining microphone exists among a multitude of the noise obtaining microphones, if the previously specified noise obtaining microphone fails to exist, the controller measures noise levels from voice signals received from a multitude of the noise obtaining microphones (S34).

The controller compares the noise levels of the voice signals received from a multitude of the noise obtaining microphones (S35). As a result of the comparison, the controller estimates the noise at the second level from the voice signal received by the noise obtaining microphone having a highest noise level (S36).

Meanwhile, when a multitude of voice obtaining microphones are provided, the controller estimates the noise at the second level from the voice signal received by the noise obtaining microphone (S30) and then checks whether a multitude of voice obtaining microphones are provided (S41). If a multitude of the voice obtaining microphones are provided, the controller checks a previously specified voice obtaining microphone exists among a multitude of the voice obtaining microphones (S42).

If the previously specified voice obtaining microphone exists, the controller eliminates the noise at the first level from the voice signal received by the previously specified voice obtaining microphone based on the estimated noise (S43). In the step S42 of checking whether the previously specified voice obtaining microphone exists among a multitude of the voice obtaining microphones, if the previously specified voice obtaining microphone fails to exist, the controller measures noise levels from voice signals received from a multitude of the voice obtaining microphones (S44).

The controller compares the noise levels measured from the voice signals received from a multitude of the voice obtaining microphones (S45). As a result of the comparison, the controller eliminates the noise at the first level from the voice signal received by the noise obtaining microphone having the lowest noise level (S46).

Accordingly, the present invention can effectively eliminate a noise of a voice signal received from a voice obtaining microphone by increasing a signal to noise ratio by disposing a noise obtaining microphone near a noise source, thereby improving a remote voice recognition rate. The present invention can raise a voice recognition rate by eliminating a noise of a voice signal having a smallest noise level in case of a presence of a multitude of voice obtaining microphones, thereby improving reliability on an execution operation according to a voice command.

The present invention can raise a voice recognition rate by estimating a nose of a voice signal at a highest noise level and then eliminating a noise of a voice signal received from a voice obtaining microphone in case of a presence of a multitude of voice obtaining microphones, thereby improving reliability on an execution operation according to a voice command.

The present invention can eliminate a noise of a voice signal by increasing a signal-to-noise ratio by rotating to move a noise obtaining microphone in a direction of a noise source having a greatest noise generated therefrom using a rotation frame having a noise obtaining microphone and the voice obtaining microphone disposed therein. Also, the present invention can eliminate a noise of a voice signal by increasing a signal-to-noise ratio by rotating to move a noise obtaining microphone in a direction of a noise source having a noise generated therefrom due to vibration by disposing a vibration sensor.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
a voice obtaining microphone configured to receive a voice signal including a noise at a first level;
a noise obtaining microphone configured to receive a voice signal including a noise at a second level higher than the first level;
a controller configured to:
estimate the noise at the second level from the voice signal received by the noise obtaining microphone,
remove the noise at the first level from the voice signal received by the voice obtaining microphone based on the estimated noise, and
perform an operation corresponding to the voice signal having the noise at the first level eliminated therefrom;
a body unit forming an exterior of the electronic device; and
a rotational frame configured to rotate along a circumference of the body unit by being coupled with the body unit,
wherein a first seat recess having the voice obtaining microphone seated thereon and a second seat recess having the noise obtaining microphone seated thereon are disposed in the rotational frame, and
wherein the controller is further configured to move the noise obtaining microphone in a direction having a highest noise level by rotating the rotational frame based on a noise level of the voice signal received from the noise obtaining microphone.

2. The electronic device of claim 1, wherein the voice obtaining microphone is disposed in a first distance from a noise source generating the noise,
wherein the noise obtaining microphone is disposed in a second distance from the noise source generating the noise, and
wherein the first distance is longer than the second distance.

3. The electronic device of claim 1, wherein one side of the first seat recess toward an inner direction of the body unit is sealed with a cover, and
wherein a via hole is formed in another side of the first seat recess toward an outer direction of the body unit.

4. The electronic device of claim 3, wherein the first seat recess is filled with a sound absorbing material.

5. The electronic device of claim 1, wherein one side of the second seat recess toward an inner direction of the body unit is open, and
wherein another side of the second seat recess toward an outer direction of the body unit is closed.

6. The electronic device of claim 5, wherein an open direction of the one side of the second seat recess faces the noise source generating the noise.

7. The electronic device of claim 1, further comprising:
a multitude of voice obtaining microphones disposed in prescribed distances from each other.

8. The electronic device of claim 7, wherein the multitude of the voice obtaining microphones are disposed in equal distances from each other.

9. The electronic device of claim 7, wherein if the electronic device moves, the controller is further configured to remove the noise at the first level from the voice signal received by a preset specific voice obtaining microphone among the multitude of the voice obtaining microphones, and perform the operation corresponding to the voice signal having the noise at the first level eliminated therefrom, and
wherein if the electronic device stops, the controller is further configured to perform the operation corresponding to the voice signal received by a prescribed one of the multitude of the voice obtaining microphones except the specific voice obtaining microphone.

10. The electronic device of claim 1, wherein the controller is further configured to rotate the rotational frame having the noise obtaining microphone disposed therein,
wherein each time the noise obtaining microphone is rotationally moved by a prescribed distance, the controller is further configured to measure a noise level from the voice signal received by the noise obtaining microphone, and
wherein if 1-rotational operation of the rotational frame is completed, the controller is further configured to rotationally move the noise obtaining microphone in a direction having a highest noise level based on the measured noise level.

11. The electronic device of claim 1, further comprising:
a vibration sensor configured to sense vibration of the body unit by being disposed in the body unit,
wherein the controller is further configured to move the noise obtaining microphone to a moving unit configured to move the electronic device as close as possible by rotating the rotational frame based on a vibration strength sensed by the vibration sensor.

12. The electronic device of claim 11, wherein if the vibration strength is equal to greater than a preset reference, the controller is further configured to move the noise obtaining microphone to the moving unit, and
wherein if the vibration strength is smaller than the present reference, the controller is further configured to ignore the sensed vibration strength.

13. The electronic device of claim 11, wherein the moving unit comprises at least one roller.

14. The electronic device of claim 1, wherein a multitude of the voice obtaining microphones are provided, and the controller is further configured to remove the noise at the first level from the voice signal received by a previously specified one of the multitude of the voice obtaining microphones.

15. The electronic device of claim 1, wherein a multitude of the voice obtaining microphones are provided, and the controller is further configured to compare noise levels of voice signals received from the multitude of the voice obtaining microphones, and
wherein as a result of the comparison, the controller is further configured to eliminate the noise at the first level from the voice signal received by the voice obtaining microphone having the lowest noise level.

16. The electronic device of claim 1, wherein a multitude of the noise obtaining microphones are provided, and the controller is further configured to estimate the noise at the second level from the voice signal received by a previously specified one of the multitude of the noise obtaining microphones.

17. The electronic device of claim 1, wherein a multitude of the noise obtaining microphones are provided, and the controller is further configured to compare noise levels of voice signals received from the multitude of the noise obtaining microphones, and
wherein as a result of the comparison, the controller is further configured to estimate the noise at the second level from the voice signal received by the noise obtaining microphone having the highest noise level.

18. An electronic device, comprising:
a multitude of voice obtaining microphones configured to receive a voice signal including a noise at a first level and disposed in prescribed distances from each other, wherein one of the multitude of voice obtaining microphones is sealed with a cover containing a sound absorbing material, and the others of the multitude of voice obtaining microphones are not;
a noise obtaining microphone configured to receive a voice signal including a noise at a second level higher than the first level; and
a controller configured to:
estimate the noise at the second level from the voice signal received by the noise obtaining microphone,
remove the noise at the first level from the voice signal received by the multitude of voice obtaining microphones based on the estimated noise, and
perform an operation corresponding to the voice signal having the noise at the first level eliminated therefrom,
wherein if the electronic device moves, the controller is further configured to remove the noise at the first level from the voice signal received by the sealed voice obtaining microphone, and perform the operation corresponding to the voice signal having the noise at the first level eliminated therefrom, and wherein if the electronic device stops, the controller is further configured to perform the operation corresponding to the voice signal received by a prescribed one of the multitude of the voice obtaining microphones except the sealed voice obtaining microphone.

* * * * *